Dec. 12, 1961      C. M. BROWNE      3,012,924
ELECTRICALLY CONDUCTING UNIT
Filed Dec. 17, 1956      2 Sheets-Sheet 1
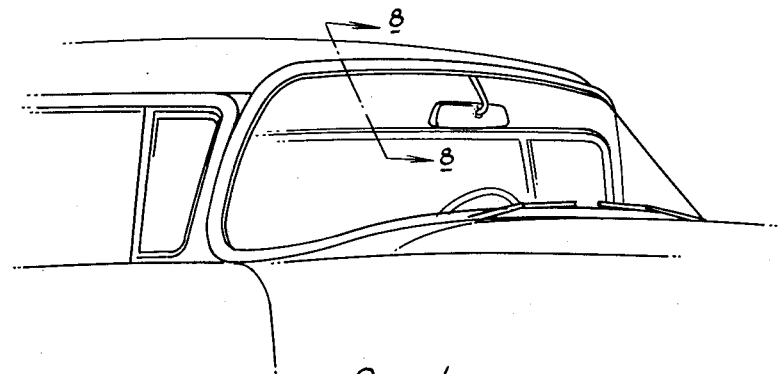
*Fig. 1*
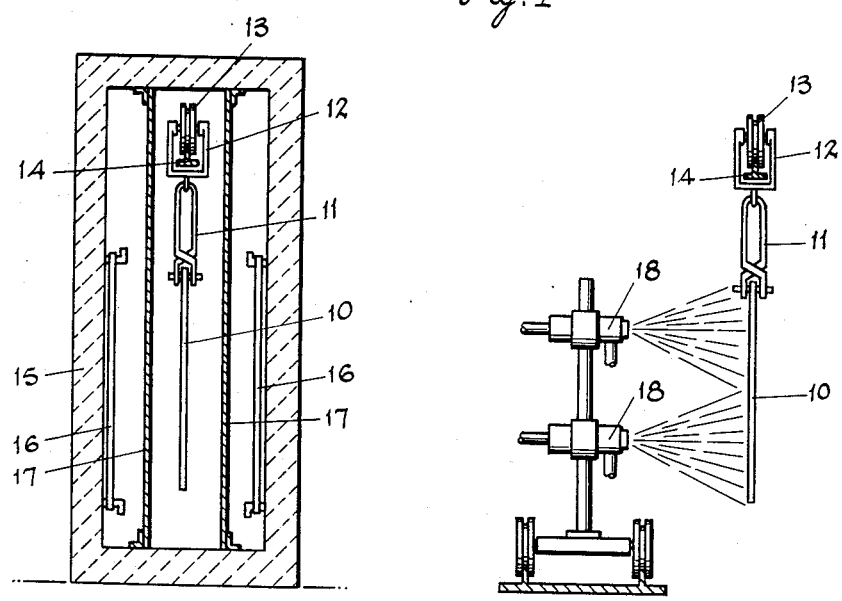
*Fig. 2*      *Fig. 3*
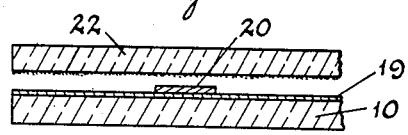
*Fig. 6*
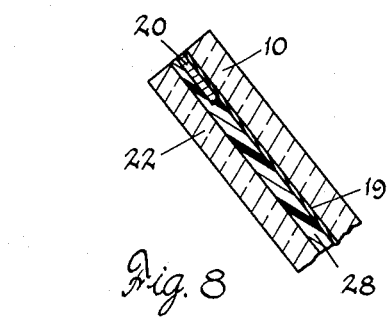
*Fig. 8*
INVENTOR.
Charles M. Browne
BY
Nobbe & Swope
ATTORNEYS Dec. 12, 1961 C. M. BROWNE 3,012,924
ELECTRICALLY CONDUCTING UNIT
Filed Dec. 17, 1956 2 Sheets-Sheet 2

INVENTOR.
Charles M. Browne
BY
Nobbe & Swope
ATTORNEYS

United States Patent Office 3,012,924
Patented Dec. 12, 1961

3,012,924
ELECTRICALLY CONDUCTING UNIT
Charles M. Browne, Toledo, Ohio, assignor to Libbey-Owens-Ford Glass Company, Toledo, Ohio, a corporation of Ohio
Filed Dec. 17, 1956, Ser. No. 628,717
11 Claims. (Cl. 156—89)

The present invention relates broadly to improved electrically conducting laminates such as electrically conducting windshields and to a novel method of producing the same. More particularly, this invention is concerned with a method of making a curved laminated glass unit provided with an electrically conducting film and a novel electrode material.

Electrically conducting glass laminates have been widely used commercially as de-icing windshields for aircraft which will remove or prevent ice, frost and fog formations. Many such windshields are now required to be of curved shape, and this invention is particularly valuable in connection with the production of these curved or bent shapes. Of even greater value from a commercial standpoint is the fact that the invention may be used to particular advantage in making curved one-piece automobile windshields and it will be described in detail in that connection here. However, in its broad aspect this invention is applicable to any electrically conducting laminated safety glass structure.

In accordance with state safety codes, automobile windshields are required to be of laminated safety glass which is made up of two sheets or plates of glass laminated together with an interlayer of non-brittle thermoplastic material, such as polyvinyl butyral resin. Before actual laminating, however, the glass sheets or plates are bent in pairs on suitable molds as they are conveyed through a heated furnace. According to the present invention, such windshields are also equipped with a transparent film or coating capable of conducting electrical energy and operative to remove accumulations of ice, frost, or fog by internal heating of the glass laminate.

In the conventional method of preparing an electrically conducting sheet of glass, the electrode material is applied and fired on before the filming operation. However, we have found it preferable, in our operation, to film the sheet before applying the electrode material. Also, we prefer to film and bend substantially rectangular sheets of glass and pattern cut the sheet after it has been bent.

It is a primary object of this invention to combine the steps of the above-mentioned bending operation and filming operation in a manner to provide an electrically conducting curved glass sheet without requiring the number of steps heretofore used.

This new filming and bending operation, briefly stated, involves heating the glass sheet to substantially its point of softening, and then spraying the surface of the heated glass sheet with a suitable material, such as a tin halide, to form upon said sheet a transparent, continuous electrically conducting coating of tin oxide, then applying strips of an electrically conducting fusible material in spaced areas, pairing the thus treated sheet with a second sheet or plate of glass and placing the pair of sheets on a bending mold, and subjecting the sheets to heat to fire on the fusible material and cause the glass to bend to the desired curvatures.

It has been found that when conventional glass frit materials are used to form the electrodes by this process, failure of the electrode materials results. It has also been found that this failure is due to the fact that the frit is fired in a confined atmosphere and subjected to reducing conditions which are not present in the conventional firing situation.

Accordingly, another object of this invention is to provide an electrode material which is capable of being fired in a substantially confined atmosphere or between matched sheets or plates of glass.

In addition, the preferred form of this invention requires the electrode material to be fired-on over the electrically conducting film. Such a procedure has been rejected in the past because of difficulty in providing a good bond between the electrode material and the glass sheet and difficulty due to high resistance at the interface between the electrode and the film.

It is therefore another object of this invention to provide an improved electrode material which may be fired-on over the electrically conducting film with good bonding and improved soldering properties as well as satisfactory electrical contact with the electrically conducting film.

Other objects and advantages of the invention will become more apparent during the course of the following description when taken in connection with the accompanying drawings.

In the drawings, wherein like numerals are employed to designate like parts throughout the same:

FIG. 1 is a partial perspective view illustrating an automobile having a windshield made in accordance with this invention;

FIG. 2 is a vertical sectional view through a heating furnace which may be used to heat the glass sheet prior to filming;

FIG. 3 is an end view of a spraying apparatus for applying the filming material to the heated sheet;

FIG. 6 is a fragmentary sectional view illustrating the position of the electrode material during the bending step;

FIG. 8 is a cross-sectional view taken along the lines 8—8 of FIG. 1.

Figure 4:
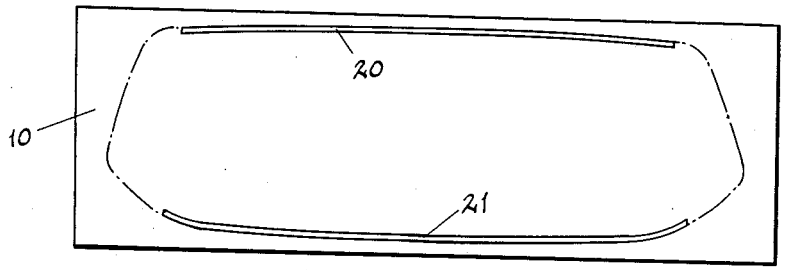
FIG. 4 is a plan view of the filmed glass sheet illustrating the placement of electrode material thereon and showing in broken lines, the general pattern used in the final windshield.

In accordance with this invention, a curved laminated glass structure is produced by first providing a substantially flat rectangular sheet or plate of glass with an electrically conducting film. In order to accomplish this, a sheet of glass 10, after being thoroughly cleaned, is supported by tongs 11 in vertical relation to a carriage 12 which is provided with wheels 13 travelling on a monorail 14, as shown in FIG. 2. The carriage is then moved to convey the glass into and through a tunnel-type furnace 15 in which it is heated to substantially its softening point so that after removal it is sufficiently hot to be filmed. The furnace 15 may be heated in any suitable manner such as electric resistance heaters 16, and may be equipped with baffles 17 to provide a more uniform temperature throughout.

After the sheet 10 has reached the required temperature, it is removed from the furnace and brought into filming position as shown in FIG. 3 where it is sprayed over its entire surface with a filming liquid from the spray guns 18. The filming liquid may be a solution of a tin compound such as any of the tin halides known to produce a film of the desired characteristics. For example, stannic tetrachloride will react with a hot glass to leave a thin, transparent, tightly adherent, electrically conducting film or coating 19 of tin oxide on the glass, and preferably the entire surface of the glass sheet is sprayed to have a film formed thereon. An electrically conducting film 19 may be applied by any of the well known procedures for applying such a film and it is to be understood that this invention is not limited to tin oxide films prepared from solutions of tin halides as set forth in the illustration, although such films are preferred in the practice of this invention.

After the sheet 10 has been filmed, it is provided preferably along its longitudinal axis and adjacent the longitudinal edges thereof with predeterminedly arranged parallel strips 20 and 21 of a fusible material, such as a metal-flux as shown in FIG. 4. In the practice of this invention, a special metal flux material is needed because the conventional materials used in forming electrodes for electrically conducting glass units are inoperative in the present process.

This special metal-flux material for the electrodes, which will be described in detail hereinafter, is disposed on the surface of the glass blank according to the known outline of the pattern to be cut from the sheet and the opposed longitudinal edges of the pattern cut sheet. Naturally, the contour of the pattern cut sheet will vary with the required shape of the finished windshield. It is therefore preferable to employ a jig or template by means of which the electrode material will be accurately disposed upon the glass blank to form the electrodes 20 and 21.

After allowing the electrode material to air dry, a suitable parting material such as sodium sulfate is applied over the dried electode material and the glass sheet, and a second sheet of glass 22 is placed thereover to provide a pair of sheets ready for bending having the electrically conducting film 19 and the electrodes 20 and 21 (not shown) disposed therebetween as shown in FIG. 6.

Figure 5:
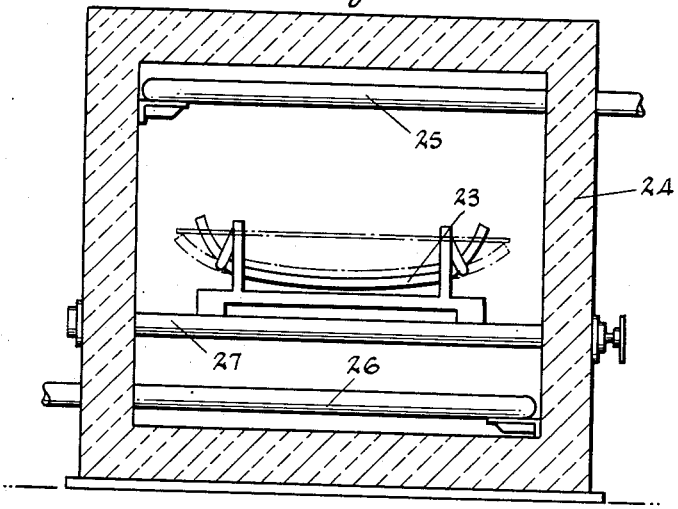
FIG. 5 is a vertical sectional view of a bending furnace illustrating the bending step of this invention.
Figure 7:
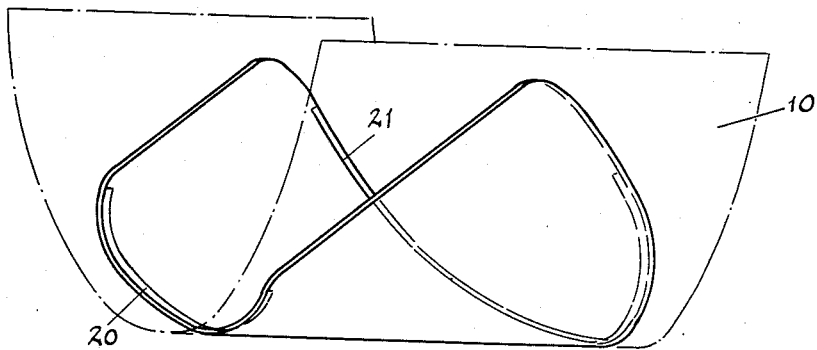
FIG. 7 is a perspective view of the bent glass sheet produced in accordance with this invention and illustrating the manner in which it is pattern cut from the bent rectangular sheet of glass.

The matched pair of sheets 10 and 22 are positioned on a bending mold 23, as illustrated in FIG. 5 and passed through a tunnel-type bending furnace 24 which may be heated by burners 25 and 26 or other means to heat the glass sufficiently to cause it to sink by gravity into the contours of the bending mold according to well known procedures for bending glass sheets, as the mold 23 is conveyed through the furnace on rollers 27. As the glass sheet is heated during the bending thereof, the electrodes 20 and 21 are fired onto the glass sheet 10 to provide permanent mechanical adherence thereto in electrical contact with the electrically conducting film 19.

In order to prevent the electrode material from firing onto both glass sheets, it is necessary to supply parting material for this purpose also. Sodium sulfate has been mentioned above as a parting material to prevent the two sheets of glass from fusing to each other during bending, and it is also satisfactory to prevent the electrode material from fusing onto both glass sheets. However, the amount of sodium sulfate ordinarily employed as parting material is insufficient to prevent the undesired fusing of the electrode so that an excess is required in the electrode area.

The sodium sulfate is preferably applied by spraying a suspension of the material in methyl alcohol and drying, which quickly volatilizes the alcohol and leaves a thin even coating of sodium sulfate on the surface. This coating may be applied to either of the glass sheets or it may be applied to both sheets. However, it is preferred to apply an extra amount adjacent to the dried electrodes because it is in this area that sticking is most likely.

Another problem which exists in firing on the electrode material during the bending step is that the conventional electrode materials do not mature properly, and tend to form only a weak, poorly bonded electrode when so applied. Accordingly, it is necessary to provide an electrode which can be fired on in such a situation without deterioration. After considerable work, we have found that the deterioration of electrodes that are fired during bending is caused by the fact that they are fired on in a substantially confined atmosphere as illustrated in FIGS. 5 and 6, whereas in the prior known procedure the electrode material was exposed to air which is, of course, an oxidizing environment. When the bending furnace is gas or combustion heated, there is also a reducing atmosphere within the furnace. In accordance with this invention, this difficulty is overcome by providing oxidizing means within the atmosphere, or by using a metal-flux that is not easily reduced. Preferably, both of these solutions are employed.

A conventional metal-flux composition of the type heretofore used for providing fired on electrodes consists of a powdered metal, a glass frit and an organic binder material. A typical composition is a mixture containing 65.6% silver, 7.8% flux, 18% organic liquid binder and 8.6% thinner. Ordinarily the silver contains an organic leafing agent such as stearic acid which decomposes during firing to form a reducing carbon. The usual organic binder and thinner in the present Electrapane process is a pine oil type vehicle which also forms reducing carbon when fired. The glass frit material which is used as a fluxing agent for firing on the electrode is ordinarily high in lead oxide, which has the advantage of providing a low fluxing temperature and gives excellent adherence. However, when this lead oxide glass is fired in a reducing atmosphere the lead oxide is reduced at least partially which causes the deterioration of the electrode material.

As has been stated, these materials are satisfactory when the firing is done in contact with atmospheric oxygen, but are not suitable in the present process unless means for supplying oxygen are provided within the confined area.

There are a number of ways in which oxygen may be supplied, and this invention is intended to embrace all of these whether the oxygen is applied internally within the metal flux to provide a material which has sufficient oxygen of its own to prevent reducing during pyrolysis, or situations in which the oxygen is applied externally to the frit in close position to supply oxygen to the frit during firing.

When the oxidizing means are provided with a metal flux, a number of materials may be used. Precipitated silver powder may be used instead of silver flake to avoid the need for leafing agents which form reducing carbon upon decomposition. Instead of a pine oil type of vehicle, an organic binder may be used which is an oxidizing material in itself such as nitrocellulose. While such a material assists in avoiding the destruction of the electrode materials, it is preferred to also use silver oxide in the electrode material when a silver flux is used. A typical formula for a silver flux that will mature between hardened glass during the bending thereof in accordance with this invention is as follows:

| | Parts by weight |
|---|---|
| Nitrocellulose | 2 |
| 325 mesh glass | 5 |
| Silver oxide | 25 |
| Silver powder | 25 |
| Solvents to give desired consistency. | |

In addition to the above, beneficial results are achieved when a non-lead borate glass frit is substituted for the lead glass usually found in commercial frits. A typical non-lead glass composition is as follows:

| | |
|---|---|
| $Al_2O_3$ | 20.7 |
| CaO | 9.3 |
| $K_2O$ | 3.3 |
| $Na_2O$ | 1.2 |
| $Li_2O$ | 3.2 |
| $B_2O_3$ | 43.9 |
| $SiO_2$ | 16.7 |
| $SnO_2$ | 1.7 |

While any of the above suggested materials have beneficial results, it is preferred to use combinations of these materials rather than one individually. However, over all of the above solutions mentioned, it is believed that the use of silver oxide in the metal flux is the most important contribution. This material allows for some reducing conditions to be otherwise present because the silver oxide decomposes upon pyrolysis to form oxygen which serves as oxidizing means and also silver which provides for the desired electrical conductivity in the finished electrode or bus bar. Other metal oxides which decompose to form the metal and oxygen upon pyrolysis may be substituted for silver oxide, if desired, however silver oxide is found to be entirely satisfactory.

When the electrode material contains silver oxide, it is found that the bond between the electrode and the electrically conducting film is as good or better than the bond ordinarily achieved when conventional frit type materials are fused directly on the glass surface. In addition, such electrode materials have superior tinning properties which provide improved lead wire attachment when the lead wires are soldered onto the electrode. Accordingly, the silver flux electrode material which contains silver oxide has advantages whenever it is desired to fire the electrode material over the electrically conducting film as well as in the specific aspect of firing the electrode material during bending.

When the external supply method of providing oxidizing environment is used, materials are added to the inside surfaces of the paired sheets which are internally decomposed to form oxygen materials such as chromates, chlorates, or various peroxides. These may be used as an oxygen source and such materials which decompose to provide oxygen at high temperatures are well known. However, it is necessary to use a material which does not etch or stain the glass during the decomposition thereof and materials which release a large amount of oxygen are preferred. A suspension of potassium dichromate in methyl alcohol was sprayed, in one instance of the present invention, to coat the inside surfaces, and a conventional metal flux was used with good electrode results. The dichromate also serves as a parting material and reduces the amount of sodium sulfate used for this purpose.

After the glass sheet 10 has been bent and the electrode matured in accordance with the above procedure, the paired sheets are pattern cut and lead wires are soldered on to the electrodes 20 and 21 according to well known procedures for lead wire attachment. The matched pair is then cleaned and laminated with a plastic interlayer 28 such as polyvinyl butyral to form a curved panoramic safety glass window.

While the above procedure has been described in connection with the production of curved automobile windshields, such invention is deemed applicable wherever it is desired to provide a curved pair of glass sheets in which one or both has an electrically conducting film thereon and in which it is desired to fire the electrode during the bending of the sheets. For example, this invention may have application in the formation of curved electroluminescent panels in which a curved pair of electrically conducting glass sheets are used with a field-responsive phosphor and a dielectric material disposed therebetween.

It is to be understood that the forms of the invention disclosed herein are to be taken as the preferred embodiments thereof, and that various procedural changes may be resorted to without departing from the spirit of the invention or the scope of the following claims.

I claim:

1. A method of producing an electrically conducting bent glass unit, comprising providing the sheet of glass with an electrically conducting film, applying a pair of spaced strips of fusible silver-flux electrode material having powdered silver, a non-lead glass frit, silver oxide and an organic binder of the oxidizing type over the electrically conducting film, placing a second sheet of glass over the electrically conducting sheet with a parting material disposed therebetween, positioning the pair of glass sheets on a bending mold, and heating the glass sheets to simultaneously fire on the electrode material and bend the glass sheets.

2. A method of producing an electrically conducting bent glass unit, comprising providing a sheet of glass with an electrically conducting tin oxide film, applying a pair of spaced strips of fusible electrode material over the electrically conducting film, said electrode material consisting essentially of silver metal, flux, organic binder, thinner, and silver oxide, placing a second sheet of glass over the electrically conducting sheet with a parting material disposed therebetween, positioning the pair of glass sheets on a bending mold, and heating the glass sheets to simultaneously fire on the electrode material and bend the glass sheets.

3. A method of producing an electrically conducting bent glass unit as defined in claim 2, in which the binder is an oxidizing material.

4. A method of producing an electrically conducting glass unit as defined in claim 2, in which the electrode material contains the following materials in substantially the proportions given:

| | Parts by weight |
|---|---|
| Nitrocellulose | 2 |
| 325 mesh glass | 5 |
| Silver oxide | 25 |
| Silver powder | 25 | and solvents, said mesh glass being a low melting non-lead glass.

5. A method of producing an electrically conducting bent glass unit comprising providing a sheet of glass with an electrically conducting film, applying a pair of spaced strips of fusible electrode material over the electrically conducting film, said electrode material containing powdered metal, a non-lead glass frit, a metal oxide which is thermally decomposable to release oxygen, and an organic binder of the oxidizing type applying a thin coating of a salt having the property of releasing oxygen upon pyrolysis as a parting material on the glass sheet, placing a second sheet of glass over the electrically conducting sheet with a parting material disposed therebetween, positioning the pair of glass sheets on a bending mold, and heating the glass sheets to simultaneously fire on the electrode material and bend the glass sheets.

6. A method of producing an electrically conducting bent glass unit as defined in claim 5, in which the salt is potassium dichromate.

7. A method of producing an electrically conducting bent glass unit, comprising providing the sheet of glass with an electrically conducting film, applying a pair of spaced strips of fusible powdered silver, a non-lead glass frit, silver oxide and an organic binder of the oxidizing type incorporated therein over the electrically conducting film, placing a second sheet of glass over the electrically conducting sheet with a parting material disposed therebetween, positioning the pair of glass sheets on a bending mold, heating the glass sheets to simultaneously fire on the electrode material and bend the glass sheets, assembling the pair of glass sheets with a plastic interlayer sandwiched therebetween, and subjecting the assembly to heat and pressure to form a laminated unit.

8. A method of producing an electrically conducting bent glass unit, comprising providing a sheet of glass with an electrically conducting tin oxide film, applying a pair of spaced strips of fusible electrode material over the electrically conducting film, said electrode material consisting essentially of silver metal, flux, organic binder, thinner, and silver oxide, placing a second sheet of glass over the electrically conducting sheet with a parting material disposed therebetween, positioning the pair of glass sheets on a bending mold, heating the glass sheets to simultaneously fire on the electrode material and bend the glass sheet, assembling the pair of glass sheets with a plastic interlayer sandwiched therebetween, and subjecting the assembly to heat and pressure to form a laminated unit.

9. A method of producing an electrically conducting bent glass unit, comprising providing a sheet of glass with an electrically conducting film, applying a pair of spaced strips of fusible electrode material over the electrically conducting film, said electrode material containing powdered metal, a non-lead glass frit, a metal oxide which is thermally decomposable to release oxygen, and an organic binder of the oxidizing type applying a thin coating of a salt having the property of releasing oxygen upon pyrolysis and serving as a parting material on the glass sheet, placing a second sheet of glass over the electrically conducting sheet with a parting material disposed therebetween, positioning the pair of glass sheets on a bending mold, heating the glass sheets to simultaneously fire on the electrode material and bend the glass sheets, assembling the pair of glass sheets with a plastic interlayer sandwiched therebetween, and subjecting the assembly to heat and pressure to form a laminated unit.

10. A method of producing an electrically conducting glass unit which comprises providing an electrically conducting film on a surface of a glass sheet, applying strips of a mixture comprising silver powder, a non-lead glass frit, silver oxide, and an organic binder of the oxidizing type, and heating the glass sheet to provide permanent attachment of the strips of mixture as silver-containing electrodes to said electrically conducting film.

11. An electrically conducting glass unit including an electrically conducting film on the glass, and an electrode comprising a mixture of silver metal, a glass frit and silver oxide fused together on said glass unit and in intimate contact with said film.

References Cited in the file of this patent

UNITED STATES PATENTS

| | | |
|---|---|---|
| 2,461,878 | Christensen et al. | Feb. 15, 1949 |
| 2,507,036 | McCrumm et al. | May 9, 1950 |
| 2,592,601 | Raymond et al. | Apr. 15, 1952 |
| 2,676,117 | Colbert et al. | Apr. 20, 1954 |

FOREIGN PATENTS

| | | |
|---|---|---|
| 200,474 | Australia | Dec. 14, 1955 |

OTHER REFERENCES

The Condensed Chemical Dictionary, Fifth Ed. (1956), page 893 of interest.